US012618978B2

(12) United States Patent　　　　(10) Patent No.:　US 12,618,978 B2
Cheng　　　　　　　　　　　　　　　(45) Date of Patent:　　　May 5, 2026

(54) DEMODULATING QZSS SIGNALS

(71) Applicant: u-blox AG, Thalwil (CH)

(72) Inventor: Zhenlan Cheng, Thalwil (CH)

(73) Assignee: u-blox AG, Thalwil (CH)

( * ) Notice:　Subject to any disclaimer, the term of this patent is extended or adjusted under 35 U.S.C. 154(b) by 483 days.

(21) Appl. No.: 18/072,211

(22) Filed:　　Nov. 30, 2022

(65)　　　　　Prior Publication Data

US 2023/0176227 A1　Jun. 8, 2023

(30)　　Foreign Application Priority Data

Dec. 7, 2021　(EP) ..................................... 21212919

(51) Int. Cl.
　　*G01S 19/05*　　　(2010.01)
　　*G01S 19/42*　　　(2010.01)
　　*H04W 64/00*　　　(2009.01)
(52) U.S. Cl.
　　CPC .............. *G01S 19/05* (2013.01); *G01S 19/42* (2013.01); *H04W 64/006* (2013.01)
(58) Field of Classification Search
　　CPC ......... G01S 19/05; G01S 19/42; G01S 19/32; G01S 19/243; G01S 19/24; G01S 19/29; G01S 19/30; H04W 64/006
　　See application file for complete search history.

(56)　　　　　References Cited

U.S. PATENT DOCUMENTS

| | | | | | |
|---|---|---|---|---|---|
| 5,471,217 | A | * | 11/1995 | Hatch | ................... G01S 19/426 |
| | | | | | 342/357.27 |
| 2020/0333472 | A1 | * | 10/2020 | Marshall | ................. G01S 19/43 |
| 2022/0035046 | A1 | * | 2/2022 | Takanohashi | ........ H04B 1/7073 |

FOREIGN PATENT DOCUMENTS

| | | | | |
|---|---|---|---|---|
| AU | 2013294159 | | 2/2015 | |
| AU | 2013294159 | A1 * | 2/2015 | ............. G01S 19/24 |
| JP | 2019-074436 | | 5/2019 | |
| JP | 2019074436 | A * | 5/2019 | |
| WO | WO 2000/031888 | | 6/2000 | |
| WO | WO-0031888 | A1 * | 6/2000 | ............. G01S 19/24 |
| WO | WO-2014017338 | A1 * | 1/2014 | ............. G01S 19/24 |
| WO | WO 2020/059219 | | 3/2020 | |
| WO | WO-2020059219 | A1 * | 3/2020 | ........... G01S 19/243 |

OTHER PUBLICATIONS

H. Zhang: An Optimized Acquisition Scheme with Half Interleaving Code Patterns in a QZSS Lex Single Frequency Receiver (Year: 2016).*

Zhang, "An Optimized acquisition scheme with half interleaving code patterns in a QZSS LEX single frequency receiver," Proceedings of the 29th International Technical Meeting of the ION Satellite Division, (ION GNSS+ 2016), 2016, pp. 417-426.

Extended Search Report in European Appln. No. 21212919.1, dated May 18, 2022, 9 pages.

* cited by examiner

*Primary Examiner* — Kathy W Wang-Hurst

(74) *Attorney, Agent, or Firm* — Fish & Richardson P.C.

(57)　　　　　ABSTRACT

A method and apparatus are provided for demodulating an L1S signal from a satellite in the Quasi-Zenith Satellite System (QZSS). The method comprises tracking another L1 signal transmitted by the satellite, and predicting, based on the tracking parameters of the other L1 signal, one or more parameters of the L1S signal. The L1S signal is demodulated based on the one or more predicted parameters.

11 Claims, 3 Drawing Sheets

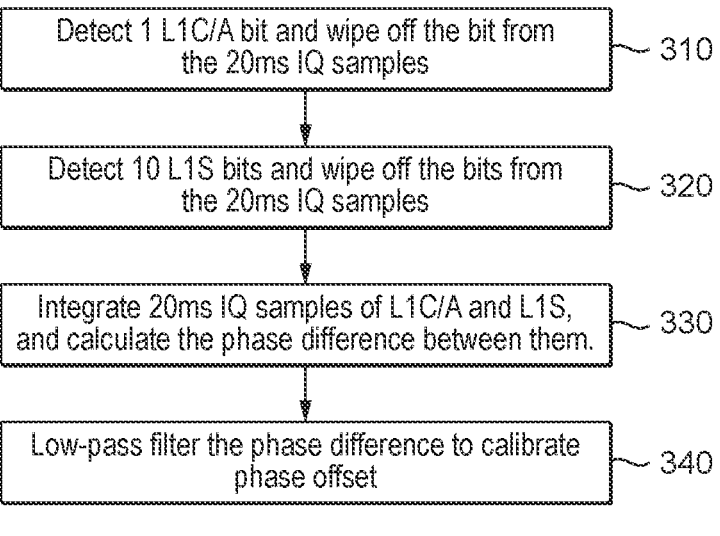

Detect 1 L1C/A bit and wipe off the bit from the 20ms IQ samples — 310

Detect 10 L1S bits and wipe off the bits from the 20ms IQ samples — 320

Integrate 20ms IQ samples of L1C/A and L1S, and calculate the phase difference between them. — 330

Low-pass filter the phase difference to calibrate phase offset — 340

FIG. 3

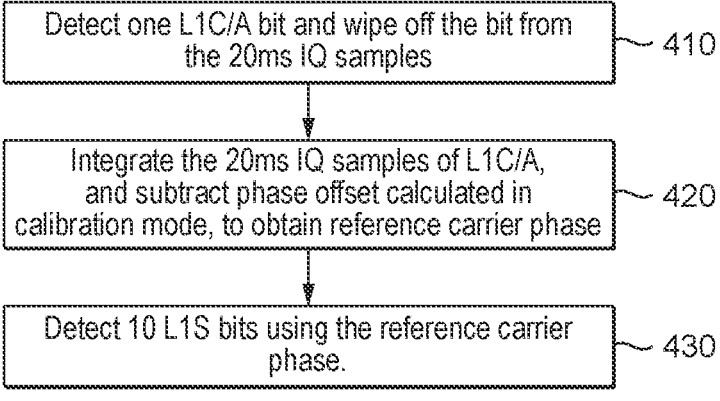

Detect one L1C/A bit and wipe off the bit from the 20ms IQ samples — 410

Integrate the 20ms IQ samples of L1C/A, and subtract phase offset calculated in calibration mode, to obtain reference carrier phase — 420

Detect 10 L1S bits using the reference carrier phase. — 430

FIG. 4

DEMODULATING QZSS SIGNALS

CROSS-REFERENCE TO RELATED APPLICATIONS

This application claims the benefit of priority to European Application No. 21212919.1, filed on Dec. 7, 2021, the contents of which are hereby incorporated by reference.

FIELD OF THE INVENTION

The present invention relates to Global Navigation Satellite Systems (GNSS). In particular, it relates to a method for demodulating signals of the Quasi-Zenith Satellite System (QZSS) and a GNSS receiver configured to demodulate QZSS signals.

BACKGROUND OF THE INVENTION

Techniques for GNSS positioning are well known in the art. Existing GNSS include the Global Positioning System (GPS), Galileo, GLONASS, and BeiDou Navigation Satellite System (BDS), also referred to herein as simply "Bei-Dou". Each GNSS comprises a constellation of satellites, also known in the art as "space vehicles" (SVs), which orbit the earth. Typically, each SV transmits a number of satellite signals. These are received by a GNSS receiver whose position it is desired to calculate. The GNSS receiver can make a number of ranging measurements using the signals, to derive information about the distance between the receiver and respective satellites. When a sufficient number of measurements can be made, the receiver's position can then be calculated by multilateration.

In addition to the signals transmitted for ranging purposes (on which data in the form of a navigation message may be modulated), the SVs may transmit one or more data signals. These are not intended to be used directly for ranging measurements. Instead, they may be used to provide data messages, which may support one or more purposes. One possible purpose is to provide a satellite-based augmentation system (SBAS). The aim of such an augmentation system is to improve the integrity-assurance, accuracy, reliability, and/or availability of the GNSS, by incorporating additional external information into the positioning calculations. An SBAS uses ground infrastructure to measure signals from the SVs. Based on these measurements, corrections are calculated, which compensate for sources of error (including effects such as clock drift and ionospheric delay, for example). The corrections are transmitted to the SVs, and broadcast by the SVs as messages in the one or more data signals. In this way, the SVs can transmit correction data that allows a receiver to correct positioning measurements that it makes based on the other signal(s) of that satellite. An SBAS typically operates at a regional or continental scale.

The Quasi-Zenith Satellite System (QZSS), developed by the Japanese government, provides a regional satellite-based augmentation system. Its aim is to enhance GPS in the Asia-Oceania region, with a focus on Japan. The QZSS satellite orbits are chosen so that at least one satellite is almost directly overhead in Japan, at any given moment. The signals broadcast are compatible with GPS. In this way, QZSS increases the availability of GPS in urban canyons in Japan, where the signals of satellites at low elevations would not be received or may be subject to severe multipath. The QZSS includes an L1S signal which is used to transmit data messages to support an SBAS called the sub-meter level augmentation service (SLAS). The QZSS L1S signal is also referred to as the L1 sub-meter accuracy service or the L1-SAIF (submeter-class augmentation with integrity function) signal. The L1S signals are transmitted in the same band as the GPS L1 signals centred at 1575.42 MHz.

SUMMARY OF THE INVENTION

It would be desirable to demodulate L1S signals as efficiently and accurately as possible, so that a GNSS receiver can best make use of the services supported by these signals.

According to one aspect, there is provided a method of demodulating an L1S signal from a satellite in the Quasi-Zenith Satellite System, the method comprising:

tracking another L1 signal transmitted by the satellite, to estimate one or more parameters of the other L1 signal;

predicting, based on the estimated one or more parameters of the other L1 signal, one or more parameters of the L1S signal transmitted by the satellite; and demodulating the L1S signal to obtain data bits of a data message modulated on the L1S signal by the satellite, wherein the demodulating is based on the one or more predicted parameters.

Conventionally, the L1S signal is demodulated without any aiding. However, the data message modulated on the L1S signal has a channel bit-duration of 2 ms. This can make it prone to bit-detection errors, especially in circumstances in which the carrier-to-noise ratio is low. The other L1 signal is an L1 signal other than the L1S signal. It may comprise an L1 positioning, navigation and timing (PNT) signal, optionally an L1 ranging signal. The present inventor, noting that demodulation may be more reliable for the other L1 signal (which may have a longer bit duration) has recognised that it may be beneficial to demodulate the L1S signal aided by the tracking parameters of the other L1 signal. Instead of providing (for example) separate code- and carrier-tracking loops for the L1S signal, the demodulation (bit-detection) for the L1S signal can be aided by the tracking loop(s) for the other L1 signal. This can result in higher decoding sensitivity for the data message of the L1S signal. In particular, decoding may be more robust in a fast fading environment.

The other L1 signal may be an L1C/A signal, an L1C/B signal, or an L1C signal, for example.

The method may further comprise (in particular, before tracking the other L1 signal) receiving the other L1 signal and the L1S signal. The signals may be received via an antenna by an RF front-end (as summarised later, below).

Optionally: the one or more parameters of the other L1 signal may comprise a code phase of the other L1 signal; the one or more parameters of the L1S signal may comprise a code phase of the L1S signal; and the method may comprise predicting, based on the estimated code phase of the other L1 signal, the code phase of the L1S signal.

The code phase of the L1S signal may be predicted based solely on the estimated code phase of the other L1 signal. In particular, the code phase of the L1S signal may be predicted without tracking the L1S signal. The predicted code phase of the L1S signal may be set identical to the estimated code phase of the other L1 signal.

The method may further comprise controlling a correlator configured to de-spread the L1S signal using the estimated code phase of the other L1 signal. This may comprise, in particular: controlling the generation of a replica spreading code of the L1S signal using the estimated code phase of the other L1 signal; and multiplying the L1S signal by the generated replica spreading code.

Optionally: the one or more parameters of the other L1 signal may comprise a carrier phase of the other L1 signal; the one or more parameters of the L1S signal may comprise a reference carrier phase of the L1S signal; and the method may comprise predicting, based on the estimated carrier phase of the other L1 signal, the reference carrier phase of the L1S signal.

Each carrier phase may be a residual carrier phase.

Demodulating the L1S signal may comprise: detecting a carrier phase associated with one of the data bits of the data message of the L1S signal; and comparing the detected carrier phase with the reference carrier phase to determine a value of the bit. Determining the value of the bit may also be referred to as "detecting" the bit.

The step of demodulating the L1S signal based on the predicted reference carrier phase of the L1S signal may be performed in an "aiding" mode.

Predicting the reference carrier phase of the L1S signal may comprise adding or subtracting a phase offset to or from the estimated carrier phase of the other L1 signal.

The phase offset may correspond to a difference between the estimated carrier phase of the other L1 signal and an estimated carrier phase of the L1S signal. The carrier phase of the L1S signal may be estimated in a "calibration" mode. The carrier phase of the other L1 signal may be estimated in both the calibration mode and the aiding mode. The L1S signal may be demodulated based on the reference carrier phase in the aiding mode.

The phase offset may be positive or negative. Accordingly, it should be understood that "adding" and "subtracting" phase offsets can be considered equivalent, since adding a negative number is the same as subtracting a positive number.

The method may further comprise calibrating the phase offset, comprising: detecting a bit in the other L1 signal; wiping off the detected bit from I/Q samples of the other L1 signal; after wiping off said detected bit, integrating a plurality of the I/Q samples of the other L1 signal; estimating the carrier phase of the other L1 signal based on a result of said integrating; detecting one or more bits in the L1S signal; wiping off the detected one or more bits from I/Q samples of the L1S signal; after wiping off said detected one or more bits, integrating a plurality of the I/Q samples of the L1S signal; estimating a carrier phase of the L1S signal based on a result of said integrating; and comparing the estimated carrier phase of the other L1 signal with the estimated carrier phase of the L1S signal to calibrate the phase offset.

Integrating the plurality of the I/Q samples of the other L1 signal may comprise integrating in a first dwell. Integrating the plurality of the I/Q samples of the L1S signal may comprise integrating in a second dwell. The second dwell may be equal to the first dwell. For example, the first dwell and the second dwell may both be 20 ms in duration.

The phase offset may be calibrated in the calibration mode. It may be used to assist demodulating the L1S signal in the aiding mode.

The phase offset may be set equal to the phase difference between the estimated carrier phase of the other L1 signal and the estimated carrier phase of the L1S signal.

When calibrating the phase offset (in particular, in the calibration mode), the step of detecting one or more bits in the L1S signal may be performed independently of the estimated one or more parameters of the other L1 signal.

When calibrating the phase offset (in particular, in the calibration mode), the step of detecting one or more bits of the L1S signal may comprise temporal differential bit detection.

The method may further comprise low-pass filtering the phase offset. The phase offset between the other L1 signal and the L1S signal is assumed to be constant over time; therefore, low-pass filtering may help to remove noise and improve the quality of the calibration.

Calibrating the phase offset may be performed when a carrier-to-noise ratio of the L1S signal is greater than a predetermined threshold. That is, the method may comprise selecting the calibration mode when the carrier-to-noise ratio of the L1S signal is greater than the predetermined threshold. The threshold may be greater than or equal to 35 dBHz. Optionally, the threshold may be less than or equal to 50 dBHz. A threshold level of 38 dBHz was found to produce good results.

The step of demodulating the L1S signal based on the one or more predicted parameters of the L1S signal may be performed when the carrier-to-noise ratio of the L1S signal is less than a predetermined threshold.

Accordingly, the method may comprise selecting the aiding mode when the carrier-to-noise ratio of the L1S signal is less than the predetermined threshold.

The same threshold level may be used in both cases.

In this way, aiding based on the other L1 signal may be used to help with demodulation of the L1S signal when the L1S signal is weak, and the aiding method may be calibrated when the L1S signal is strong. This can provide a useful hybrid system, which demodulates the L1S signal aided by the other L1 signal when the L1S signal is relatively weak (and therefore more susceptible to inaccurate demodulation), and demodulates the L1S signal without aiding when the L1S signal is relatively strong, while at the same time calibrating the aiding system.

Demodulating the L1S signal based on the one or more predicted parameters of the L1S signal may comprise demodulating the L1S signal based on at least the predicted reference carrier phase of the L1S signal.

Demodulating the L1S signal optionally comprises comparing a carrier phase of the L1S signal with the reference carrier phase to detect data bits in the L1S signal. The decision variable for bit detection may comprise the difference between the instantaneous carrier phase of the L1S signal and the reference carrier phase derived from the other L1 signal.

As mentioned above, demodulating the L1S signal in this way may be performed in the aiding mode.

Also provided is a computer program comprising computer program code configured to cause one or more physical computing devices to perform all the steps of a method as summarized above when said computer program is run on said one or more physical computing devices. The one or more physical computing devices may comprise or consist of one or more processors of a GNSS receiver. The computer program may be stored on a computer-readable medium (optionally non-transitory).

Also provided is a GNSS receiver, configured to demodulate an L1S signal from a satellite in the Quasi-Zenith Satellite System, hereinafter QZSS, the GNSS receiver comprising:

at least one tracking loop, configured to track another L1 signal transmitted by the satellite, to estimate one or more parameters of the other L1 signal;

a prediction subsystem, configured to predict, based on the estimated one or more parameters of the other L1 signal, one or more parameters of the L1S signal transmitted by the satellite; and an L1S bit detector, configured to demodulate the L1S signal to obtain data bits of a data message modulated on the L1S signal by the satellite, wherein the L1S bit detector is configured to demodulate the L1S signal based on the one or more predicted parameters.

The one or more tracking units, the one or more prediction units, and the L1S bit detector may each be defined either in software or hardware of the GNSS receiver. In some examples, all of these components are defined in software.

The GNSS receiver may further comprise: an RF front-end, for receiving the L1S signal and the other L1 signal, and for down-converting and digitising both signals; and a mixer for wiping off a residual carrier from the signals. The GNSS receiver may further comprise an intermediate-frequency (IF) processing unit, for processing the signals down-converted from RF to IF by the RF front-end. An output of the RF front-end may be coupled to an input of the intermediate-frequency processing unit. An output of the first IF processing unit may be coupled to an input of the mixer.

The GNSS receiver may further comprise at least a first correlator, coupled to an output of the mixer, configured to wipe off a spreading code of the other L1 signal. The first correlator may be part of a bank of correlators, including early, prompt, and late correlators. Similarly, the GNSS receiver may further comprise a second correlator, coupled to an output of the mixer, configured to wipe off a spreading code of the L1S signal.

One or more outputs of the first correlator may be coupled to the at least one tracking loop. At least one output of the second correlator may be coupled to an input of the L1S bit detector.

The tracking loop may include a bit detector configured to demodulate the other L1 signal to obtain data bits of a navigation message modulated on the other L1 signal by the satellite.

The one or more parameters of the other L1 signal may comprise a code phase of the other L1 signal; the one or more parameters of the L1S signal may comprise a code phase of the L1S signal; the at least one tracking loop may comprise a code-phase feedback controller configured to estimate the code phase of the other L1 signal; the GNSS receiver may further comprise an L1S code generator, configured to generate a replica spreading code for de-spreading the L1S signal; and the L1S code generator may be controlled by the estimated code phase.

The L1S code generator may comprise a numerically controlled oscillator (NCO), configured to generate a clock signal for generating the replica spreading code.

The L1S code generator may provide an input to the second correlator to enable it to wipe off the spreading code of the L1S signal.

The GNSS receiver may further comprise a signal code generator for the other L1 signal. This may comprise an NCO configured to generate a clock signal for generating a replica spreading code for de-spreading the other L1 signal. The signal code generator for the other L1 signal may be controlled by the estimated code phase.

The GNSS receiver may further comprise a carrier generator, configured to generate a replica carrier signal for wiping off a residual carrier from the other L1 signal and the L1S signal. The carrier generator may comprise an NCO configured to generate the replica carrier signal.

The one or more parameters of the other L1 signal may comprise a carrier phase of the other L1 signal; the one or more parameters of the L1S signal may comprise a reference carrier phase of the L1S signal; and the prediction subsystem may comprise an adder or a subtractor, configured to predict the reference carrier phase of the L1S signal by adding or subtracting a phase offset to or from the estimated carrier phase of the other L1 signal.

The prediction subsystem may comprise a comparison unit, configured to compare the estimated carrier phase of the other L1 signal with an estimated carrier phase of the L1S signal, to calibrate the phase offset. The comparison unit may comprise or consist of a subtractor, configured to calculate a difference between the two estimated carrier phases. The phase offset may be calibrated in a calibration mode of the GNSS receiver.

The GNSS receiver may have: a calibration mode in which it is configured to calibrate the phase offset; and an aiding mode in which it is configured to use the calibrated phase offset to predict the reference carrier phase of the L1S signal.

In the aiding mode, the L1S bit detector may be configured to: detect a carrier phase associated with one of the data bits of the data message of the L1S signal; and compare the detected carrier phase with the reference carrier phase to determine the value of the bit.

The GNSS receiver may further comprise a mode selector, configured to select between the aiding mode and the calibration mode. The mode selector may be configured to select the calibration mode when a carrier-to-noise ratio of the L1S signal is greater than a predetermined threshold. The mode selector may be configured to select the aiding mode when the carrier-to-noise ratio of the L1S signal is less than the predetermined threshold.

BRIEF DESCRIPTION OF THE DRAWINGS

The invention will now be described by way of example with reference to the accompanying drawings, in which:

FIG. 3 is a flowchart illustrating in greater detail a method performed in a calibration mode;

FIG. 4 is a flowchart illustrating in greater detail a method performed in an aiding mode.

It should be noted that these figures are diagrammatic and not drawn to scale.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms.

The inventor has recognised that it may be advantageous (at least under some conditions) to demodulate a QZSS L1S signal aided by the tracking parameters used to track another L1 signal transmitted by the same QZSS satellite. Effectively, this uses the other L1 signal as a pilot for the L1S signal. In the principal example described below, the other L1 signal is an L1C/A signal. However, it should be understood that the scope of the present disclosure is not limited to this example. The other L1 signal used as the basis for the aiding could alternatively be an L1C/B signal, or an L1C signal, for instance.

Figure 1:
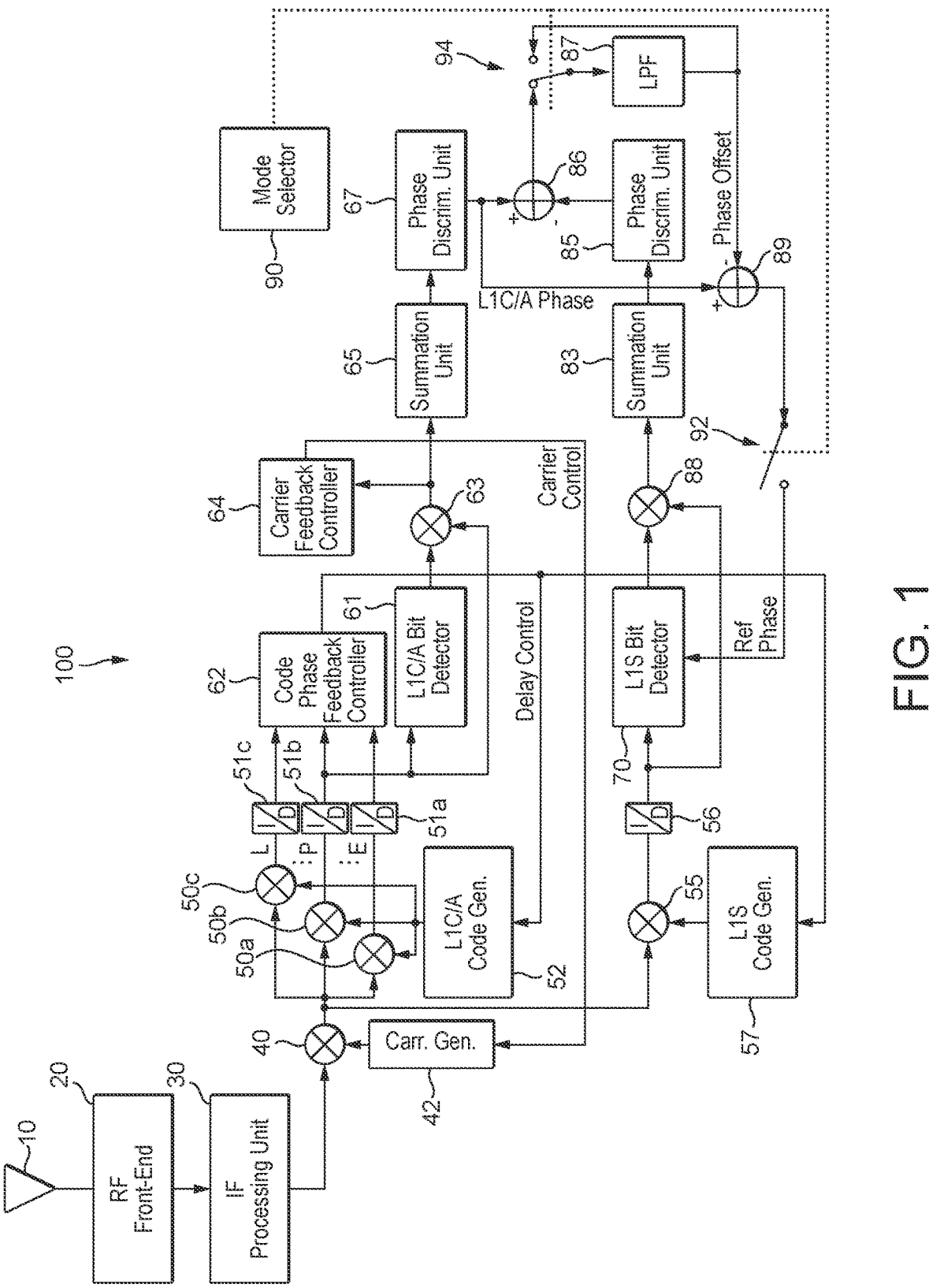
FIG. 1 is a schematic block diagram of a GNSS receiver according to an example.

FIG. 1 is a block diagram of a GNSS receiver 100 according to an example. The GNSS receiver is configured to receive satellite signals from GPS and QZSS satellites. It may additionally be configured to receive satellite signals from other constellations (for example, Galileo and Bei-Dou). The GNSS receiver comprises an antenna 10 for receiving satellite signals. An RF front-end 20, coupled to the antenna 10, is configured to down-convert and digitise the satellite signals received via the antenna 10. The RF front-end essentially conditions the signals for subsequent signal processing. Other typical tasks performed by the front-end include filtering, amplification and automatic gain control. The satellite signals received at the RF front-end 20 via the antenna 10 include a QZSS L1S signal and another QZSS L1 signal, which in the present example is an L1C/A signal.

The GNSS receiver further comprises an intermediate frequency (IF) processing unit 30, configured to process the satellite signals converted from radio frequency (RF) to IF in the RF front-end. The output of the IF processing unit 30 is coupled to an input of a mixer 40. The other input of the mixer 40 receives a local carrier wave, hereafter replica L1 carrier signal, generated to replicate the carrier frequency and phase of the incoming signal. The replica L1 carrier signal is a digital sinusoidal signal generated by a carrier generator 42. In this way the mixer 40 is configured to wipe off, i.e. remove any residual carrier, e.g. offset caused by the Doppler effect, from the incoming signal, by mixing the incoming signal with the replica L1 carrier signal (in other words, calculating the product of the incoming signal and the replica carrier signal). Although the carrier of the satellite signal is already removed before the incoming signal reaches mixer 40, there will be a carrier offset caused by the relative motion between the satellite and GNSS receiver. The carrier generator 42 comprises a numerically controlled oscillator (NCO) configured to generate the replica carrier signal.

The output of the mixer 40 is provided as input to a bank of correlators comprising three correlators. Each correlator comprises a multiplier 50*a-c* and an integrate-and-dump (I/D) unit 51*a-c*. The output of each multiplier 50*a-c* is provided as input to the respective integrate-and-dump (I/D) unit 51*a-c*. Each multiplier 50*a-c* multiplies the input signal by a replica spreading code of the other L1 signal. Each I/D unit 51*a-c* calculates the sum of the resulting product values, over a suitable dwell. The dwell defines the length of the coherent integration. The bank of correlators includes an "early" (E) correlator (comprising multiplier 50*a* and I/D unit 51*a*); a "prompt" (P) correlator (comprising multiplier 50*b* and I/D unit 51*b*); and a "late" (L) correlator (comprising multiplier 50*c* and I/D unit 51*c*). As their names suggest, these three correlators use differently shifted versions of the replica spreading code. The replica spreading code is a binary pseudo-random noise (PRN) signal, and is generated by a code generator 52, which operates under the control of a code phase feedback controller 62. The code phase feedback controller 62 receives the outputs of the three I/D units 51*a-c*. Depending on which of the three correlators (E, P, L) has the maximum output value for the current dwell, the controller 62 determines whether to adjust (for example, increment or decrement) the code phase delay control signal, which it provides to the code generator 52.

The code generator 52 is a signal code generator for the other L1 signal. It comprises an NCO, which is configured to generate a clock signal for generating the replica spreading code for the other L1 signal. The NCO is controlled by the code phase delay control signal.

In this way, the bank of correlators, together with the code phase feedback controller 62 and the code generator 52, function as a code phase tracking loop—in other words, a delay locked loop (DLL)—for the other L1 signal. The code phase tracking loop ensures that the code phase of the replica spreading code used by the "P" correlator tracks the actual code phase of the received other L1 signal with as little delay as possible.

The outputs of the I/D units 51*a-c* consist of complex-valued samples, also referred to as in-phase and quadrature samples (I/Q samples). In particular, the output of the I/D unit 51*b*, for the prompt (P) correlator, represents I/Q samples of the other L1 signal. It should be understood that, although each correlator in the bank of correlators is shown as comprising a single multiplier 50*a-c* and a single I/D unit 51*a-c*, when implemented in hardware the correlator, as with other hardware blocks, will include separate I- and Q-branches. That is, there will be a multiplier and an I/D unit for the in-phase (I) samples, and another multiplier and I/D unit for the quadrature-phase (Q) samples. Nevertheless, for simplicity, it is more convenient to illustrate these as a single multiplier and a single I/D unit, having complex outputs, and that is how they will be described here. As well as being provided as input to the code phase feedback controller 62, the I/Q samples from the "P" correlator are provided as input to an L1C/A bit detector 61, which is configured to demodulate the other L1 signal. That is, the L1C/A bit detector 61 performs bit detection on the I/Q samples, to obtain data bits of the navigation message modulated on the other L1 signal by the satellite. In the present example, the data bits are data bits of the L1C/A navigation message.

The L1C/A bit detector 61 (also referred to as a bit detection unit) outputs the bits it detects to provide a first input to a multiplier 63. Each bit is represented as either +1 or −1. The multiplier 63 also receives a second input consisting of the I/Q samples of the other L1 signal. The multiplier 63 multiplies these two inputs, in order to wipe off the detected bits from the I/Q samples. A delay element (not shown) may be provided in the path from the I/D unit 51*b* to the multiplier 63, to ensure that the detected bits are correctly aligned with the I/Q samples when they reach the multiplier 63. Following the bit wipe-off, the I/Q samples are provided to a carrier feedback controller 64. The carrier feedback controller 64 estimates the carrier frequency and carrier phase of the L1 signal. It outputs the estimate as a carrier control signal, which is fed back to control the NCO of the carrier generator 42. In providing this feedback, the L1C/A bit detector 61, multiplier 63, and carrier feedback controller 64 implement a carrier tracking loop for the L1 signal, ensuring that the frequency (and phase) of the replica L1 carrier signal (generated by the carrier generator 42) tracks the actual frequency (and phase) of the carrier of the received L1 signal as closely as possible. This enables the GNSS receiver to take account of Doppler shift, due to the relative motion between the receiver and satellite. By controlling the frequency of the NCO in the carrier generator 42, both the frequency and phase of the replica carrier signal are controlled to match the frequency and phase of the residual carrier. (The phase of the replica carrier signal is advanced by increasing the frequency; the phase is retarded by decreasing the frequency.) Effectively, this implements a phase locked loop (PLL), tracking the residual carrier frequency and phase.

The components described above enable the GNSS receiver to track the other L1 signal in frequency and phase of the carrier as well as code phase, and to demodulate it. The tracking parameters produced will be used to track and demodulate the L1S signal. This aspect of the GNSS receiver will now be described.

The signal output by the mixer 40 is also provided as an input to a correlator for de-spreading the L1S signal. This correlator comprises a multiplier 55 and I/D unit 56 (which are treated as having complex-valued outputs, in the same manner as described above for the multipliers 50*a-c* and I/D units 51*a-c*). The multiplier 55 multiplies the input baseband signal by a replica spreading code of the L1S signal. The I/D unit 56 calculates the sum of the resulting product values over a suitable dwell (defining a coherent integration period). The replica spreading code of the L1S signal is again a binary PRN signal, and is generated by a second code generator 57. The second code generator 57 is an L1S code generator. It comprises an NCO, which is configured to generate a clock signal for generating the replica spreading code for the L1S signal. The NCO is controlled by the same code phase delay control signal as the code generator 52. In this way, the de-spreading of the L1S signal is based on the code phase estimated for the other L1 signal. There is no separate tracking loop for the code phase of the L1S signal.

The output of the correlator (that is, the output of the I/D unit 56) consists of I/Q samples of the L1S signal. This output is provided as input to an L1S bit detector 70, which is configured to demodulate the L1S signal to obtain data bits of its data message. That is, the L1S bit detector 70 is configured to perform bit detection on the L1S signal.

The L1S bit detector 70 has two modes of operation—an aiding mode and a calibration mode—in which it utilises respective different ways of performing bit detection. In the aiding mode, the L1S bit detector 70 detects L1S bits by comparing the I/Q samples of the L1S signal with a reference carrier phase. This reference carrier phase is predicted based on an estimated carrier phase of the other L1 signal. More specifically, the reference carrier phase is predicted by subtracting a phase difference value from the estimated carrier phase of the other L1 signal. This subtraction is performed by a subtractor 89.

The estimation of the carrier phase of the other L1 signal will now be described. Following wipe-off of the bits of the other L1 signal by the multiplier 63, the I/Q samples of the other L1 signal are provided as input to a summation unit 65, which is configured to integrate a plurality of these samples. In the present example, the L1C/A bit detector 61 detects one bit of the L1C/A signal at a time, and the multiplier 63 wipes off that bit from the I/Q samples of the L1C/A signal. The summation unit 65 integrates over the bit duration—which is 20 ms in this example. The output of the summation unit 65 is a complex-valued integration result. This is passed to a phase discrimination unit 67, which determines the phase of the complex value, thereby estimating the carrier phase of the L1C/A signal. The carrier phase estimate output by the phase discrimination unit 67 is provided as an input to the subtractor 89.

It is assumed that the reference carrier phase for demodulating the L1S signal is related to the carrier phase of the other L1 signal by a fixed phase offset. This fixed phase offset is estimated in the calibration mode (to be described further below).

In the calibration mode, the L1S bit detector 70 detects the bits of the L1S signal using stand-alone temporal differential bit detection. In other words, the demodulation of the L1S signal is carried out without any assistance, e.g. reference phase from subtractor 89. Note that although assistance information, e.g. reference phase, is estimated in this mode, it is not fed to the L1S bit detector 70 because switch 92 is open as illustrated in FIG. 1. A group of ten L1S bits is detected, corresponding to the bit duration (20 ms) of one bit of the L1C/A signal. Following bit detection, the ten detected bits are provided as an input to a second multiplier 88. The other input to the second multiplier 88 consists of the I/Q samples output by the I/D unit 56. The second multiplier 88 multiplies the I/Q samples by the detected bits, in order to wipe off the detected bits from the I/Q samples. A delay element (not shown) may be provided in the path from the I/D unit 56 to the multiplier 88, to ensure that the detected bits are correctly aligned with their corresponding I/Q samples when they reach the multiplier 88.

Following the bit wipe-off, the I/Q samples of the L1S signal are output by the second multiplier 88 to a second summation unit 83, which is configured to integrate a plurality of the I/Q samples. Specifically, according to the present example, the second summation unit 83 integrates I/Q samples over the 20 ms duration of the ten wiped-off bits. The output of the second summation unit 83 is a complex value, which is passed to a second phase discrimination unit 85. The second phase discrimination unit 85 determines the phase of the complex value, thereby estimating the carrier phase of the L1S signal. This carrier phase estimate is then output to a second subtractor 86. The carrier phase estimate output by the phase discrimination unit 67 is also provided as an input to this second subtractor 86. The second subtractor 86 is configured to subtract the estimated carrier phase of the L1S signal (produced by the second phase discrimination unit 85) from the estimated carrier phase of the other L1 signal (produced by the phase discrimination unit 67). The resulting difference between the two estimated carrier phases provides the basis for the phase offset, which will be used in the aiding mode to predict the reference carrier phase of the L1S signal.

In the calibration mode, the phase difference output by the second subtractor 86 is provided as input to a low-pass filter (LPF) 87. The low-pass filter 87 calculates the average of the phase difference over several successive dwells—that is, over several successive 20 ms integration periods of the summation units 65 and 83. This smooths transient variations in the phase difference, removing noise and improving the reliability of the estimation. The output of the low-pass filter 87 is the phase offset, which is provided to the inverting input of the subtractor 89. Once it has been calibrated, in the calibration mode, the phase offset represents the phase offset between the L1C/A binary phase-shift keyed (BPSK) signal-constellation and the L1S BPSK signal-constellation.

A mode selector 90 is provided, which determines when the GNSS receiver 100 should operate in the calibration mode (depicted in FIG. 1) and when it should operate in the aiding mode. In the present example, the calibration mode is selected when the carrier-to-noise ratio of the L1S signal is greater than a predetermined threshold. This indicates that the L1S signal is being received strongly, and is likely to be demodulated correctly using the stand-alone temporal differential bit detection. In these circumstances, there is likely to be limited benefit from aiding. At the same time, the strong L1S signal is suitable for estimating the reference carrier phase.

Conversely, the mode selector 90 selects the aiding mode when the carrier-to-noise ratio of the L1S signal is less than (or equal to) the predetermined threshold. A low carrier-to-noise ratio indicates that the L1S signal is being received weakly. In these circumstances, aiding may be required to improve the quality of the bit detection. Furthermore, it would not be appropriate to calibrate the phase offset between the other L1 signal and the reference phase of the L1S signal when the L1S signal is very weak. For the present example, a predetermined threshold of 38 dBHz was found to produce good results.

The mode selector 90 controls a pair of switches 92 and 94, to configure the GNSS receiver to operate in either the calibration mode or the aiding mode, at any given time. As indicated above, FIG. 1 depicts the GNSS receiver 100 operating in the calibration mode at a particular point in time. The first switch 92 is a single pole single throw switch; the second switch 94 is a single pole double throw switch. When the mode selector selects the calibration mode, the first switch 92 is opened. This prevents the reference phase being provided to the L1S bit detector 70. The L1S bit detector 70 therefore implements stand-alone temporal differential bit detection, as described above. At the same time, the second switch 94 couples the output of the second subtractor 86 to the input of the low-pass filter 87. Consequently, the low-pass filter (LPF) 87 receives phase difference estimates from the second subtractor 86, and low-pass filters them to calibrate the phase offset.

When the mode selector 90 selects the aiding mode (not shown in FIG. 1), it closes the first switch 92. This couples the output of the subtractor 89 to the L1S bit detector 70, thereby providing the reference carrier phase to the L1S bit detector 70 for use in demodulating data bits of the L1S signal. At the same time, the mode selector 90 reconfigures the second switch 94 such that the input of the low-pass filter (LPF) 87 is coupled to the output of that filter. In other words, the low-pass filter 87 is placed in a feedback arrangement, in which it maintains a constant output, comprising the phase offset that was most recently calculated in the calibration mode. In this configuration, the LPF 87 essentially acts as a "smoothing" storage element, smoothing and holding the value of the phase offset. However, the skilled person would readily appreciate that a plain storage or delay element, i.e. a storage or delay element without the smoothing operation of a low-pass filter could be used in place of LPF 87. This enables the phase offset that was calculated in the calibration mode to be subtracted from the currently estimated phase of the other L1 signal, in the aiding mode, using the subtractor 89.

In the current implementation of the receiver 100, the blocks 20, 30, 40, 42, 50a-c, 51a-c, 52, 55, 56, and 57 are implemented in dedicated hardware. Blocks 61, 62, 63, 64, 65, 67, 70, 83, 85, 86, 87, 88, 89, 90, 92, and 94 are currently implemented in software running on a processor of the GNSS receiver. However, they could alternatively be implemented in dedicated hardware.

Figure 2:
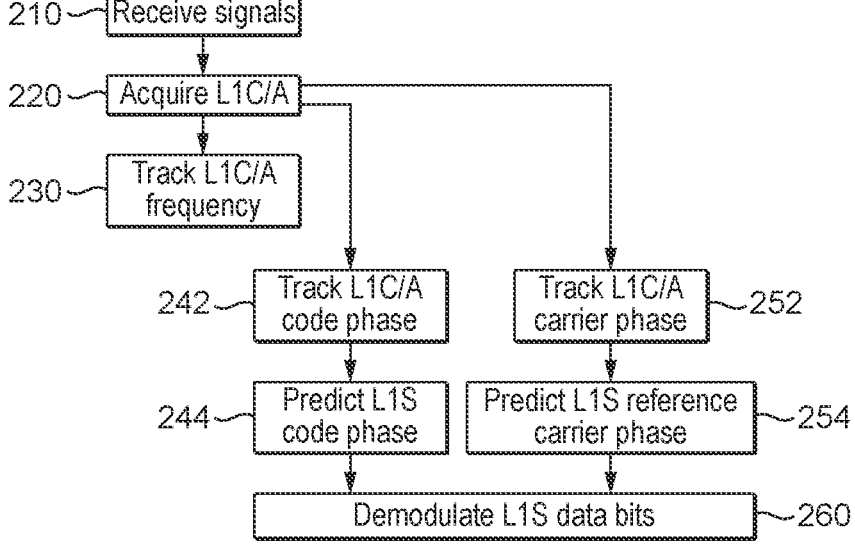
FIG. 2 is a flowchart illustrating a method performed by the GNSS receiver of FIG. 1 according to an example.

FIG. 2 illustrates a method performed by the GNSS receiver 100 according to the present example. In step 210, the GNSS receiver receives the signals of a given QZSS satellite via the antenna 10 using RF front-end 20. In practice, the receiver may receive signals from more than one QZSS satellite, in which case the method of FIG. 2 would be repeated for each satellite separately. However, for now, for the purposes of explanation, we will concentrate on the signals of just one satellite.

In step 220, the receiver acquires the other L1 signal (which, in this example, is the L1C/A signal). Methods for GNSS signal acquisition are well-known in the art and will not be described further here, since they are outside the scope of the present disclosure. Having acquired the L1C/A signal, the receiver now begins tracking it. Tracking the L1C/A signal involves estimating parameters of the L1C/A signal. In particular, the frequency of the residual carrier L1C/A signal is tracked continuously (step 230), and the phase of the residual carrier L1C/A signal is tracked continuously (step 252), using the carrier feedback controller 64. As mentioned above, the incoming signal will have a residual carrier or carrier frequency offset due to the Doppler effect caused by the relative motion between the GNSS receiver and the satellite. The code phase of the L1C/A signal is also tracked continuously (step 242), using the code phase feedback controller 62. The residual carrier phase of the L1C/A signal is estimated, using the summation unit 65 and the phase discrimination unit 67.

In step 244, the receiver predicts the code phase of the L1S signal based on the estimated code phase of the L1C/A signal. In the present example, the predicted code phase of the L1S signal is set equal to the estimated code phase of the L1C/A signal. That is, the estimated code phase of the L1C/A signal (output by the code phase feedback controller 62) is used to control both code generators 52 and 57.

In step 254, the receiver predicts a reference carrier phase for the L1S signal based on the estimated carrier phase of the L1C/A signal. As explained above, this comprises subtracting a phase offset from the estimated L1C/A carrier phase, using the subtractor 89.

It should be understood that the code phase of the L1S signal is predicted in the manner described above in both the calibration mode and the aiding mode. The reference carrier phase of the L1S signal may be predicted in both modes, but it is only provided to (and used by) the L1S bit detector in the aiding mode.

In step 260, the GNSS receiver—in particular, the L1S bit detector 70—demodulates the L1S signal to obtain data bits of the L1S data message. In the aiding mode, this demodulation (that is, bit detection) is based on the predicted reference carrier phase produced in step 254. In both modes, the demodulation is based on the predicted L1S code phase produced in step 244, in that the predicted L1S code phase (which is identical to the estimated L1C/A code phase) is used to control the L1S code generator 57, which drives the correlator 55, 56. Therefore, the predicted L1S code phase controls the de-spreading of the L1S signal, prior to demodulation by the L1S bit detector 70.

FIG. 3 illustrates in greater detail the steps performed by the GNSS receiver 100 in the calibration mode depicted in FIG. 1. In step 310, the receiver detects one L1C/A data bit (using the L1C/A bit detector 61) and wipes off this data bit (using the multiplier 63) from the corresponding 20 ms of I/Q samples. In step 320, the receiver detects ten L1S bits (using the L1S bit detector 70) and wipes off these ten bits (using the second multiplier 88) from the 20 ms of I/Q samples. Note that, in the calibration mode, the L1S bit detector 70 uses stand-alone temporal differential bit detection. It does not rely on the reference carrier phase.

In step 330, the receiver integrates 20 ms of I/Q samples of the L1C/A signal (using the summation unit 65) and integrates 20 ms of I/Q samples of the L1S signal (using the second summation unit 83). The receiver then calculates the phase difference between the two complex-valued integration results (using the phase discrimination unit 67, the second phase discrimination unit 85, and the second subtractor 86).

In step 340, the receiver low-pass filters the phase difference produced by the second subtractor 86, to calibrate the phase offset. As explained above, this step is performed by the low-pass filter 87.

FIG. 4 illustrates in greater detail the steps performed by the GNSS receiver 100 in the aiding mode. As discussed above and referring to FIG. 1, in this mode switches 92 and 94 assume the closed and right-hand side positions, respectively. In other words, the switches assume the alternative positions not shown in FIG. 1. In step 410, the receiver detects one L1C/A data bit (using the L1C/A bit detector 61), and wipes off this data bit (using the multiplier 63) from the corresponding 20 ms of I/Q samples. Step 410 is therefore identical to step 310 in FIG. 3.

In step 420, the receiver integrates the 20 ms of I/Q samples of the L1C/A signal that correspond to the detected and wiped-off data bit. This is done using the summation unit 65. The carrier phase of the L1C/A signal is estimated by the phase discrimination unit 67. The receiver then subtracts from the estimated L1C/A carrier phase the phase offset that was estimated previously in the calibration mode. As explained already above, this subtraction is performed by the subtractor 89. The output of this subtraction is the reference carrier phase.

In step 430, the L1S bit detector 70 detects ten L1S bits at a time, by comparing the instantaneous carrier phase of the L1S I/Q samples (over each 2 ms bit duration) with the reference carrier phase.

It should be understood that the scope of the present disclosure is not limited to the example described above. Many variations will be apparent to those skilled in the art, based on the foregoing description.

As already noted at the outset, various L1 signals other than the L1C/A signal may be used to aid the demodulation of the L1S signal.

In the example described above, the L1S bit detector 70 used temporal differential bit detection to demodulate the L1S signal in the calibration mode. However, this is not essential. Any other preferred approach to bit detection may be adopted instead, as desired.

The 20 ms dwells/integration periods for coherent integration described above may be beneficial; however, the method is not limited in this respect. Longer or shorter integration periods may be chosen, for example, for the summation units 65 and 83. The choice may be based on the signal conditions expected or experienced in use. For example, in highly dynamic scenarios, where the receiver is subject to frequent rapid changes in speed and/or direction, a shorter coherent integration period may be desirable, to better cope with the signal dynamics. Conversely, if the receiver is expected to be static, it might be beneficial to extend the coherent integration period—for example, so as to integrate over multiple bits of the other L1 signal.

As explained above, the low-pass filter 87 operates to smooth the estimate of the phase offset, in the calibration mode. This is beneficial, but it might not be essential in all examples. For instance, in some examples, the LPF 87 may be replaced by a delay element or other storage or memory element. In this case the delay/storage/memory element will hold the phase offset value while the GNSS receiver is operating in the aiding mode.

Other variations involve the way in which the blocks are implemented. In the example discussed above, certain components were defined in software or software modules running on a processor of the GNSS receiver. However, in other examples, some or all of these units may be implemented in dedicated, fixed-function hardware. Likewise, components that were defined in hardware, according to the example above, may be defined in software, in other embodiments.

For the avoidance of doubt, it is noted that many sources refer to the L1S data message as having a bit rate of 250 bps and therefore a bit-duration of 4 ms. However, this refers to the bit rate (and bit-duration) prior to error correction coding. After error correction coding with a half rate convolutional code, the channel bits have a duration of 2 ms, corresponding to a channel symbol rate of 500 symbols per second. The references to a 2 ms bit duration in the foregoing description refer to these bits (symbols).

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of demodulating an L1S signal from a satellite in the Quasi-Zenith Satellite System the method comprising:

tracking another L1 signal transmitted by the satellite, to estimate one or more parameters of the other L1 signal;

predicting, based on the estimated one or more parameters of the other L1 signal, one or more parameters of the L1S signal transmitted by the satellite;

demodulating the L1S signal to obtain data bits of a data message modulated on the L1S signal by the satellite, wherein the demodulating is based on the one or more predicted parameters; and calibrating a phase offset, wherein calibrating the phase offset comprises:

detecting a bit in the other L1 signal;

wiping off the detected bit from in-phase and quadrature (I/Q) samples of the other L1 signal;

after wiping off said detected bit, integrating a plurality of the I/Q samples of the other L1 signal;

obtaining an estimated carrier phase of the other L1 signal based on a result of integrating the plurality of the I/Q samples of the other L1 signal;

detecting one or more bits in the L1S signal;

wiping off the detected one or more bits from I/Q samples of the L1S signal;

after wiping off said detected one or more bits, integrating a plurality of the I/Q samples of the L1S signal;

obtaining an estimated carrier phase of the L1S signal based on a result of integrating the plurality of the I/Q samples of the L1S signal; and comparing the estimated carrier phase of the other L1 signal with the estimated carrier phase of the L1S signal to calibrate the phase offset.

2. The method of claim 1, wherein:

the estimated one or more parameters of the other L1 signal comprise an estimated code phase of the other L1 signal;

the one or more parameters of the L1S signal comprise a code phase of the L1S signal; and the method comprises predicting, based on the estimated code phase of the other L1 signal, the code phase of the L1S signal.

3. The method of claim 1, wherein the method comprises predicting, based on the estimated carrier phase of the other L1 signal, a reference carrier phase of the L1S signal.

4. The method of claim 3, wherein predicting the reference carrier phase of the L1S signal comprises adding or subtracting the phase offset to or from the estimated carrier phase of the other L1 signal.

5. The method of claim 1, further comprising low-pass filtering the phase offset.

6. The method of claim 1, wherein calibrating the phase offset is performed when a carrier-to-noise ratio of the L1S signal is greater than a predetermined threshold.

7. The method of claim 6, wherein the demodulating the L1S signal based on the one or more predicted parameters of the L1S signal is performed when the carrier-to-noise ratio of the L1S signal is less than a predetermined threshold.

8. The method of claim 1, wherein demodulating the L1S signal comprises comparing a carrier phase of the L1S signal with a reference carrier phase to detect data bits in the L1S signal.

9. One or more tangible, non-transitory, computer-readable media storing instructions that, when executed by one or more processors, cause the one or more processors to demodulate an L1S signal from a satellite in the Quasi-Zenith Satellite System, wherein the demodulating includes performing operations comprising:

tracking another L1 signal transmitted by the satellite, to estimate one or more parameters of the other L1 signal;

predicting, based on the estimated one or more parameters of the other L1 signal, one or more parameters of the L1S signal transmitted by the satellite;

demodulating the L1S signal to obtain data bits of a data message modulated on the L1S signal by the satellite, wherein the demodulating is based on the one or more predicted parameters; and calibrating a phase offset, wherein calibrating the phase offset comprises:

detecting a bit in the other L1 signal;

wiping off the detected bit from in-phase and quadrature (I/Q) samples of the other L1 signal;

after wiping off said detected bit, integrating a plurality of the I/Q samples of the other L1 signal;

obtaining an estimated carrier phase of the other L1 signal based on a result of integrating the plurality of the I/Q samples of the other L1 signal;

detecting one or more bits in the L1S signal;

wiping off the detected one or more bits from I/Q samples of the L1S signal;

after wiping off said detected one or more bits, integrating a plurality of the I/Q samples of the L1S signal;

obtaining an estimated carrier phase of the L1S signal based on a result of integrating the plurality of the I/Q samples of the L1S signal; and comparing the estimated carrier phase of the other L1 signal with the estimated carrier phase of the L1S signal to calibrate the phase offset.

10. A Global Navigation Satellite System (GNSS) receiver configured to demodulate an L1S signal from a satellite in the Quasi-Zenith Satellite System, the GNSS receiver comprising:

at least one tracking loop configured to track another L1 signal transmitted by the satellite, to estimate one or more parameters of the other L1 signal;

a prediction subsystem configured to predict, based on the estimated one or more parameters of the other L1 signal, one or more parameters of the L1S signal transmitted by the satellite; and an L1S bit detector, configured to demodulate the L1S signal to obtain data bits of a data message modulated on the L1S signal by the satellite, wherein the L1S bit detector is configured to demodulate the L1S signal based on the one or more predicted parameters, the one or more parameters of the other L1 signal comprise a carrier phase of the other L1 signal;

the one or more parameters of the L1S signal comprise a reference carrier phase of the L1S signal; and the prediction subsystem comprises an adder or a sub-
tractor, configured to predict the reference carrier phase
of the L1S signal by adding or subtracting a phase
offset to or from an estimated carrier phase of the other
L1 signal, wherein the prediction subsystem comprises a compari-
son unit, configured to compare the estimated carrier
phase of the other L1 signal with an estimated carrier
phase of the L1S signal, to calibrate the phase offset, wherein the GNSS receiver comprises a calibration mode
in which it is configured to calibrate the phase offset,
and comprises an aiding mode in which it is configured
to use the calibrated phase offset to predict the refer-
ence carrier phase of the L1S signal.

11. The GNSS receiver of claim 10, wherein:

the one or more parameters of the other L1 signal com-
prise a code phase of the other L1 signal;

the one or more parameters of the L1S signal comprise a
code phase of the L1S signal;

the at least one tracking loop comprises a code-phase
feedback controller configured to estimate the code
phase of the other L1 signal;

the GNSS receiver further comprises an L1S code gen-
erator, configured to generate a replica spreading code
for de-spreading the L1S signal; and the L1S code generator is controlled by the estimated
code phase.

*     *     *     *     *